United States Patent
French

(10) Patent No.: US 10,703,431 B2
(45) Date of Patent: Jul. 7, 2020

(54) TIGHTENING AND ADJUSTING ASSEMBLY FOR STEERING SYSTEM OF A BICYCLE

(71) Applicants: TEDDY FORMOSA CO., LTD., Taichung (TW); BEAR CORPORATION, Norwalk, CA (US)

(72) Inventor: George French, S.Yorkshire (GB)

(73) Assignees: Teddy Formosa Co., Ltd., Taichung (TW); Bear Corporation, Norwalk, CA (US)

( * ) Notice: Subject to any disclaimer, the term of this patent is extended or adjusted under 35 U.S.C. 154(b) by 305 days.

(21) Appl. No.: 15/857,182

(22) Filed: Dec. 28, 2017

(65) Prior Publication Data

US 2019/0031274 A1 Jan. 31, 2019

(30) Foreign Application Priority Data

Jul. 25, 2017 (TW) .............................. 106124971 A

(51) Int. Cl.
*B62K 21/22* (2006.01)

(52) U.S. Cl.
CPC .................................... *B62K 21/22* (2013.01)

(58) Field of Classification Search
CPC ........ B62K 21/18; B62K 21/22; B62K 21/24; B62K 21/12; B62K 21/14; B62K 21/04; B62K 19/32; B62K 19/24
See application file for complete search history.

(56) References Cited

U.S. PATENT DOCUMENTS

| | | | | |
|---|---|---|---|---|
| 607,106 A | * | 7/1898 | Winton ................. | F16B 7/0446 403/230 |
| 614,944 A | * | 11/1898 | Gaylor ................... | B62K 21/18 403/233 |
| 667,232 A | * | 2/1901 | Leaycraft ................. | B62L 3/00 280/264 |
| 681,325 A | * | 8/1901 | Hullt ...................... | B62K 21/14 74/551.2 |
| 903,468 A | * | 11/1908 | Griswold ............... | F16C 11/10 403/97 |
| 2,523,402 A | * | 9/1950 | Townsend .............. | B62K 21/14 74/551.2 |
| 3,427,043 A | * | 2/1969 | Oskam .................. | B62K 19/36 280/278 |

(Continued)

*Primary Examiner* — Kevin Hurley
*Assistant Examiner* — Conan D Duda
(74) *Attorney, Agent, or Firm* — Browdy and Neimark, PLLC

(57) ABSTRACT

The invention relates to a tightening and adjusting assembly for a steering system of a bicycle. The steering system generally includes a head tube, a steering tube rotatably mounted within the head tube by means of upper and lower headsets, and a handlebar stem tube mounted around the steering tube. The tightening and adjusting assembly has a preload member, an anchoring member and a tightening and adjusting set. The preload member is engaged with a top end of the handlebar stem tube. The anchoring member is abutted against a bottom end of the steering tube. The tightening and adjusting set is disposed in the interior of the steering tube and between the preload member and the anchoring member to draw the preload and anchoring members together and thus preload the upper and lower headsets of the steering system.

9 Claims, 5 Drawing Sheets

(56) References Cited

U.S. PATENT DOCUMENTS

| | | | | |
|---|---|---|---|---|
| 3,556,557 A * | 1/1971 | Blair | B62K 21/02 | 280/279 |
| 3,941,011 A * | 3/1976 | Kirk | B62K 21/14 | 74/551.2 |
| 3,955,828 A * | 5/1976 | Boudreau | B62K 21/22 | 280/279 |
| 4,095,911 A * | 6/1978 | Lacroix | B62K 21/22 | 403/104 |
| 4,108,460 A * | 8/1978 | Silva, Jr. | B62K 3/005 | 280/236 |
| 4,113,395 A * | 9/1978 | Pawsat | B62K 21/18 | 280/279 |
| 4,167,352 A * | 9/1979 | Pletscher | B62K 21/18 | 403/104 |
| 4,261,666 A * | 4/1981 | Katayama | B25B 9/02 | 24/279 |
| 4,379,566 A * | 4/1983 | Titcomb | B62K 21/18 | 280/251 |
| 4,390,300 A * | 6/1983 | Foster | B62K 21/22 | 280/279 |
| 4,466,629 A * | 8/1984 | Sinyard | B62K 21/06 | 280/279 |
| 4,939,950 A * | 7/1990 | Girvin | B62K 21/14 | 280/279 |
| 5,178,035 A * | 1/1993 | D'Aluisio | B62K 21/18 | 280/279 |
| 5,197,349 A * | 3/1993 | Herman | B62K 21/18 | 280/278 |
| 5,209,138 A * | 5/1993 | Shu | B62K 21/14 | 267/150 |
| 5,241,881 A * | 9/1993 | Chen | B62K 21/14 | 280/276 |
| 5,536,104 A * | 7/1996 | Chen | B62K 21/18 | 280/279 |
| 5,678,457 A * | 10/1997 | Hals | B62K 21/14 | 74/551.3 |
| 5,678,836 A * | 10/1997 | Chen | B62K 21/06 | 280/276 |
| 5,779,253 A * | 7/1998 | Lee | B62K 21/18 | 280/279 |
| 5,782,479 A * | 7/1998 | Adams | B62K 21/18 | 280/279 |
| 5,791,671 A * | 8/1998 | Tang | B62L 3/02 | 280/264 |
| 7,163,224 B1 * | 1/2007 | Song | B62K 11/14 | 280/276 |
| 7,175,162 B1 * | 2/2007 | Ratcliff | B66D 3/18 | 212/174 |
| 7,296,813 B2 * | 11/2007 | Montague | B62K 15/00 | 280/276 |
| 9,079,630 B2 * | 7/2015 | Alstrin | B62K 21/12 | |
| 9,615,472 B1 * | 4/2017 | Calfee | B62K 11/14 | |
| 9,889,904 B1 * | 2/2018 | Blake | B62K 21/18 | |
| 2004/0247384 A1 * | 12/2004 | Henricksen | B62K 21/18 | 403/344 |
| 2005/0098979 A1 * | 5/2005 | Horiuchi | B62K 19/32 | 280/279 |
| 2008/0073870 A1 * | 3/2008 | Lane | B62K 21/06 | 280/280 |
| 2009/0057505 A1 * | 3/2009 | Chen | F16M 11/28 | 248/185.1 |
| 2009/0283985 A1 * | 11/2009 | Lane | B62K 19/16 | 280/279 |
| 2010/0180713 A1 * | 7/2010 | Tseng | B62K 21/16 | 74/493 |
| 2010/0237584 A1 * | 9/2010 | Lin | B62K 21/18 | 280/280 |
| 2013/0076000 A1 * | 3/2013 | Man | B62K 19/32 | 280/279 |
| 2013/0154234 A1 * | 6/2013 | Shadwell | B62J 99/00 | 280/279 |
| 2013/0319169 A1 * | 12/2013 | Savard | B62H 5/06 | 74/551.8 |
| 2014/0178146 A1 * | 6/2014 | Ma | F16B 7/0413 | 411/80 |
| 2015/0128753 A1 * | 5/2015 | Goring | F16C 1/101 | 74/502.6 |
| 2017/0008596 A1 * | 1/2017 | D'Aluisio | B62K 19/32 | |
| 2017/0233027 A1 * | 8/2017 | DeGray | B62K 21/18 | 29/525.01 |
| 2018/0065707 A1 * | 3/2018 | Salazar | B62K 3/10 | |
| 2019/0002054 A1 * | 1/2019 | Pazzaglia | B62K 21/22 | |
| 2019/0031274 A1 * | 1/2019 | French | B62K 21/22 | |

* cited by examiner a tightening and adjusting assembly
FOR STEERING SYSTEM OF A BICYCLE

BACKGROUND OF THE INVENTION

1. Field of the Invention

The present invention relates to a bicycle, and more particularly, to a tightening and adjusting assembly for a steering system of a bicycle.

2. Description of the Related Art

Most modern bicycles use what are known as "threadless" headsets. They are called this to distinguish them from older headset designs that utilised a fork with an externally threaded steering tube and a quill stem that fitted internally. Alternatively, modern thread-less designs make use of an externally clamping stem on a fork with a smooth exterior to the steering tube. In some designs this thread is cut directly into the inside of the steering tube, but in most it engages a secondary component which is mechanically locked inside the bore of the steering tube within the top half thereof. These secondary components typically consist of either an expanding collet or wedge, or a spring fastener known as a star-nut. Such secondary components are a source of problems. The star-nut type fasteners (which are the most common type) are difficult to install and can become loose and slip, thus allowing the loss of the necessary tension from the steering bearings; they are also considered unsuitable for use with carbon-fibre forks which are becoming increasingly common. The expanding designs are heavier and more expensive than the spring type designs and, although considered more suitable for use with carbon fibre, are still prone to slipping. Another drawback which affects all existing methods of applying the necessary axial tension to the headset bearings is that they occupy a space within the steering tube, which might otherwise be employed for storage in a location that is very secure and very convenient to the rider. For example this space would lend itself to the storage of batteries for bicycle lights, electronic shifting systems, computers and other accessories.

In view of the above, it will be apparent to those skilled in the art from this disclosure that there exists a need for an improved bicycle steering structure. This invention addresses this need in the art as well as other needs, which will become apparent to those skilled in the art from this disclosure.

SUMMARY OF THE INVENTION

One object of the present invention is to provide a more secure, lighter and cheaper tightening and adjusting assembly for combining the steering system of a bicycle.

Another object of the present invention is to provide a tightening and adjusting assembly for a steering system of a bicycle that can be used to free up the majority of the space within the steering tube for storage purposes.

The foregoing objects can be achieved by providing a tightening and adjusting assembly for a steering system of a bicycle. The steering system generally includes a steering tube, a head tube, a handlebar stem tube, an upper headset and a lower headset. The steering tube is rotatably mounted within the head tube by means of the upper headset and the lower headset. The handlebar stem tube is mounted around the steering tube. The tightening and adjusting assembly of the present invention basically comprises a preload member, an anchoring member and a tightening and adjusting set to draw the preload and anchoring members together and thus preload the upper and lower headsets. The preload member is engaged with a top end of the handlebar stem tube. The anchoring member abuts against a bottom end of the steering tube. The tightening and adjusting set is disposed in the interior of the steering tube and between the preload member and the anchoring member to draw the preload and anchoring members together and thus preload the upper and lower headsets.

Preferably, according to an example of the present invention, the tightening and adjusting set comprises a suspending device, two straight bars and a tightening bolt. The suspending device has a threaded hole and is disposed at the interior of the steering tube. Each of the straight bars axially passes through the steering tube and has a first end connected with the preload member and a second end connected with the suspending device. The tightening bolt runs through the anchoring member from the outside thereof and threadedly engages with the threaded hole of the suspending device. Thus, when the tightening bolt is tightened, a pull-down force will be applied to the preload member via the two straight bars to preload the upper headset and the lower headset.

According to other examples of the present invention, the tightening and adjusting set comprises two straight bars and two adjusters. Each of the straight bars has a first end connected with the preload member and a second end with external threads. Each of the adjusters has a shank portion, an enlarged flat head portion, a step surface between the shank portion and the enlarged flat head portion, and a longitudinal hole with internal threads disposed on the shank portion. In combination, each of the adjusters passes through the anchoring member from the outside thereof such that the shank portion thereof is located at the interior of the steering tube, the step surface thereof bears against the anchoring member, and the longitudinal hole thereof is threadably mated with the second end of each of said straight bars. Thus, when the adjusters are tightened, a pull-down force will be applied to the preload member via the two straight bars to preload the upper headset and the lower headset.

BRIEF DESCRIPTION OF THE DRAWINGS

Further advantages and advantageous developments of the invention may be inferred from the following description of examples, the drawing and the claims. Wherein:

DETAILED DESCRIPTION OF THE INVENTION

Figure 1:
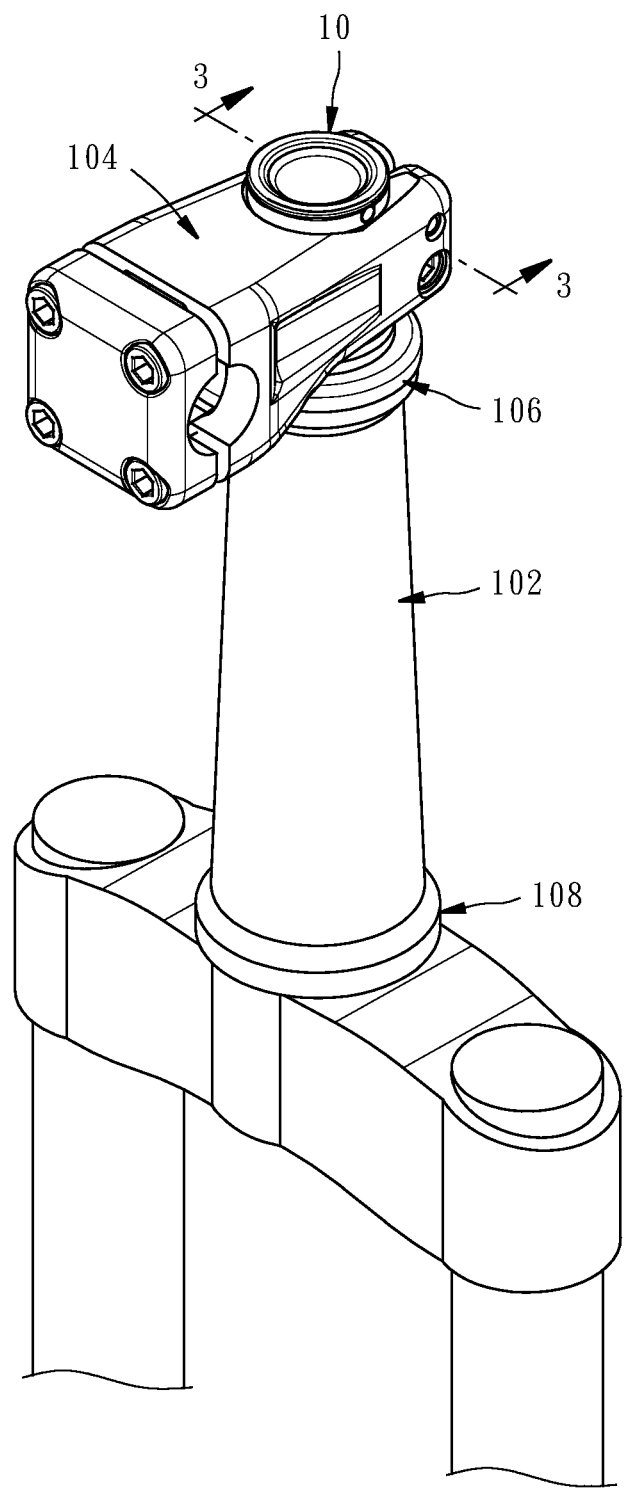
FIG. 1 is a perspective view of a first embodiment of the present invention mated with a steering tube, a head tube, a handlebar stem tube, an upper headset and a lower headset.
Figure 2:
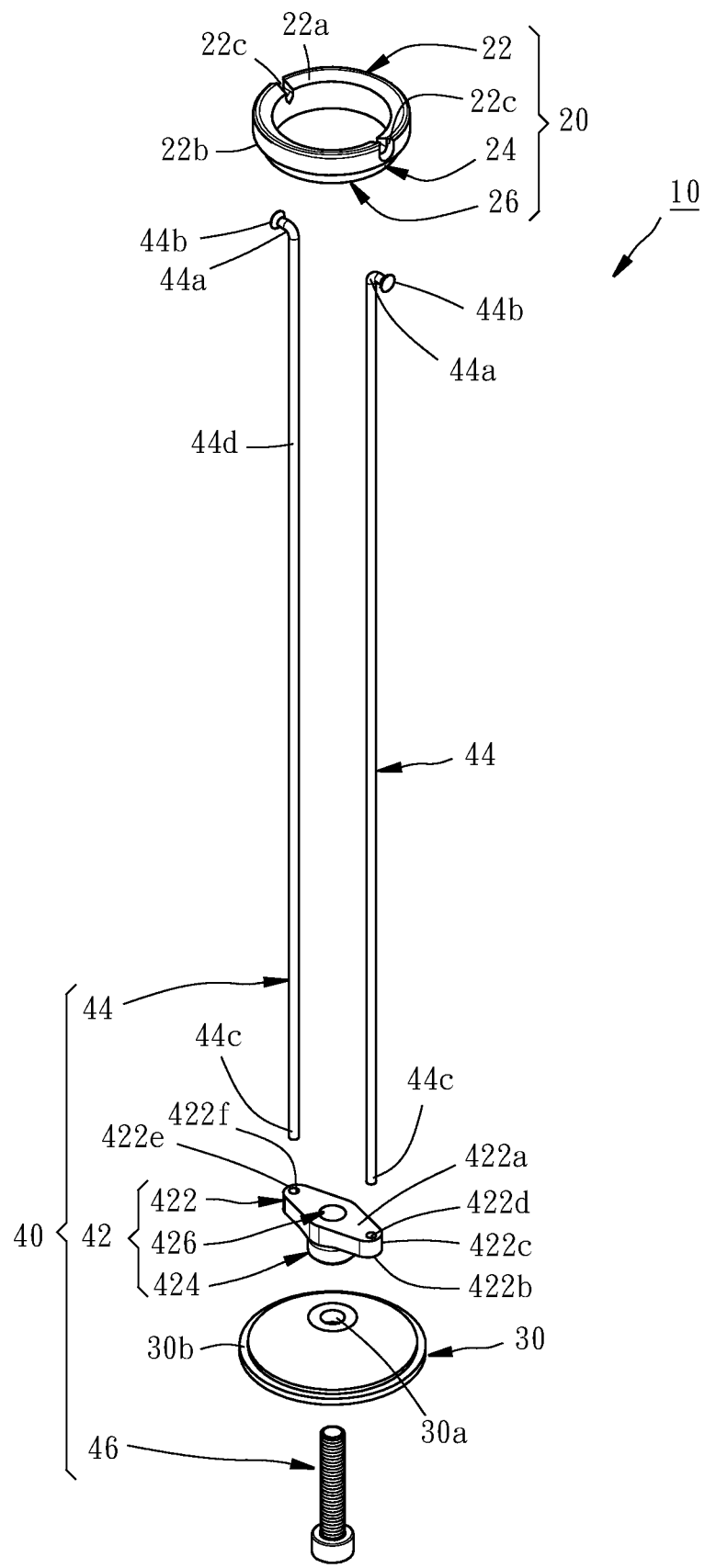
FIG. 2 is an exploded view of the first embodiment of the present invention.
Figure 3:
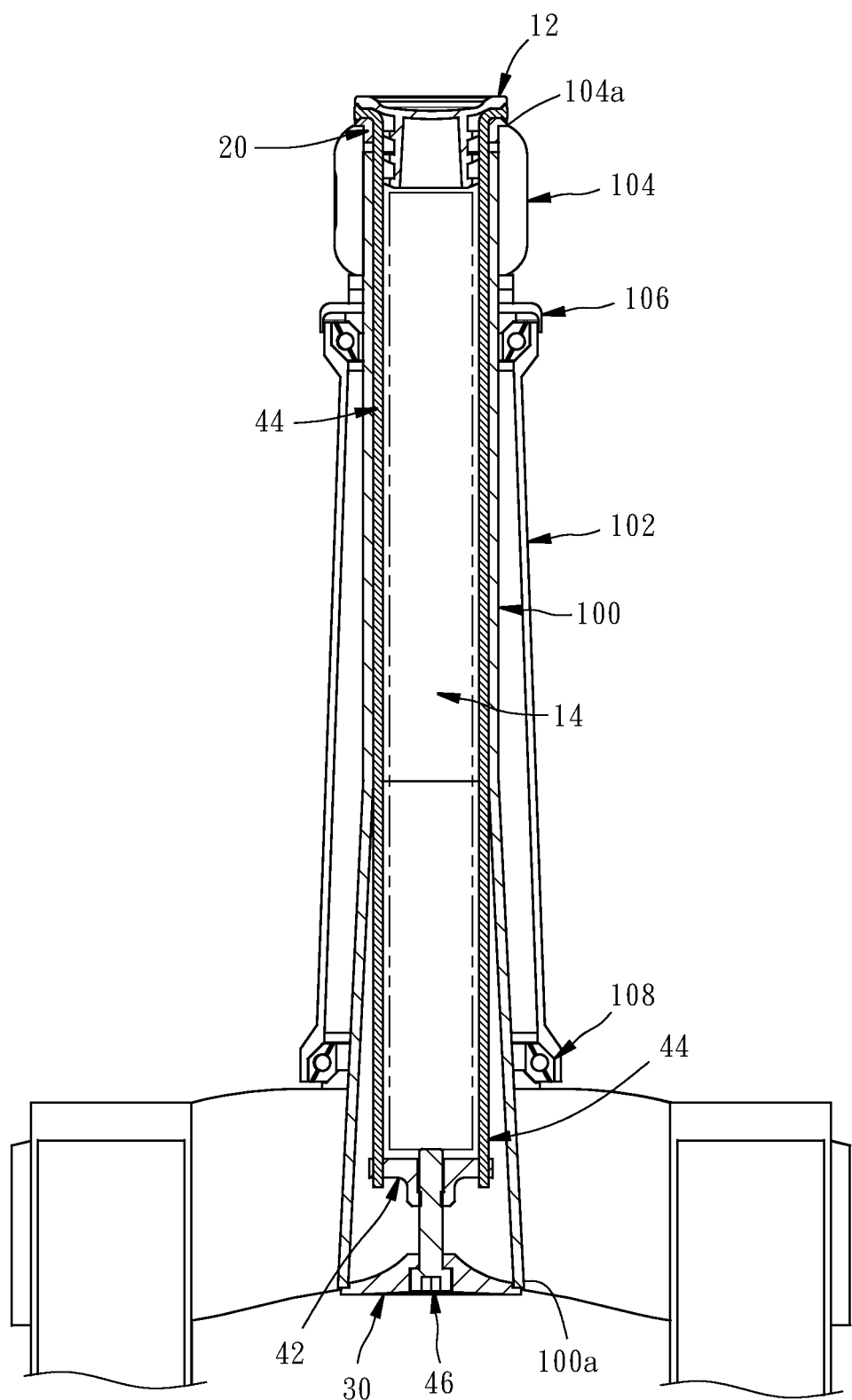
FIG. 3 is a sectional view of the first embodiment of the present invention along line 3-3 in FIG. 1.

Referring firstly to FIGS. 1 to 3, a tightening and adjusting assembly 10 for a steering system of a bicycle according to a first embodiment of the present invention is shown. The steering system includes a steering tube 100, a head tube 102, a handlebar stem tube 104, an upper headset 106 and a lower headset 108. The steering tube 100 is rotatably mounted within the head tube 102 by means of the upper headset 106 and the lower headset 108. The handlebar stem tube 104 is mounted around the steering tube 100. The steering system is a relatively conventional part of a bicycle. Thus, the steering system will not be discussed or illustrated in detail herein.

The tightening and adjusting assembly 10, as shown in FIGS. 2 and 3, comprises a preload ring 20, an anchoring plate 30 and a tightening and adjusting set 40 including a suspending device 42, two straight bars 44 and a tightening bolt 46.

The preload ring 20 includes a large portion 22 having an upper surface 22a and a lower surface 22b, a small portion 24 extending downwards from the lower surface 22b of the large portion 22, and a step portion 26 disposed between the large portion 22 and the small portion 24. The large portion 22 further has two notches 22c oppositely disposed on the upper surface 22a thereof. In combination, the small portion 24 is inserted into the handlebar stem tube 104 in such a way that the step portion 26 is engaged with the top end 104a. The anchoring plate 30 has a central opening 30a and an edge 30b abutted against the bottom end 100a of the steering tube 100.

The suspending device 42 is disposed at the interior of the steering tube 100 and has a block part 422 and a shank part 424. The block part 422 has a top surface 422a, a bottom surface 422b, a first side 422c with a first positioning hole 422d, and a second side 422e with a second positioning hole 422f. The suspending device 42 further has a threaded hole 426 running through the block part 422 from the top surface 422a thereof and extending axially along the shank part 424.

The straight bars 44 may be a bicycle spoke, a bicycle shift wire or a wire or cable made of rigid materials. The first end of the straight bar 44 includes a hook 44a and an enlarged head 44b. The hook 44a is hooked in the notch 22c of the preload ring 20. The enlarged head 44b is abutted against the side surface 22d of the large portion 22 of the preload ring 20. The second ends 44c of the straight bars 44 are respectively secured on the first and second positioning holes 422d, 422f of the block part 422 of the suspending device 42 in such a way that the bodies 44d of the straight bars 44 extend along and close the inner wall of the steering tube 100.

The tightening bolt 46 threadedly engages with the threaded hole 426 of the suspending device 42 from the outside of the anchoring plate 30 via the opening 30a thereof.

Thus, when the tightening bolt 46 is tightened, a pull-down force will be applied to the preload ring 20 via each of the straight bars 44 to preload the upper headset 106 and the lower headset 108. In this embodiment, the tightening and adjusting assembly 10 further comprises a top cap 12, as shown in FIG. 3, detachably covered on the upper surface 22a of the large portion 22 of the preload ring 20 such that a closed receiving space 14 is formed in the interior of the steering tube 100 for receiving bicycle accessories (such as battery pack, tool set, lamp, lock, etc.).

Figure 4:
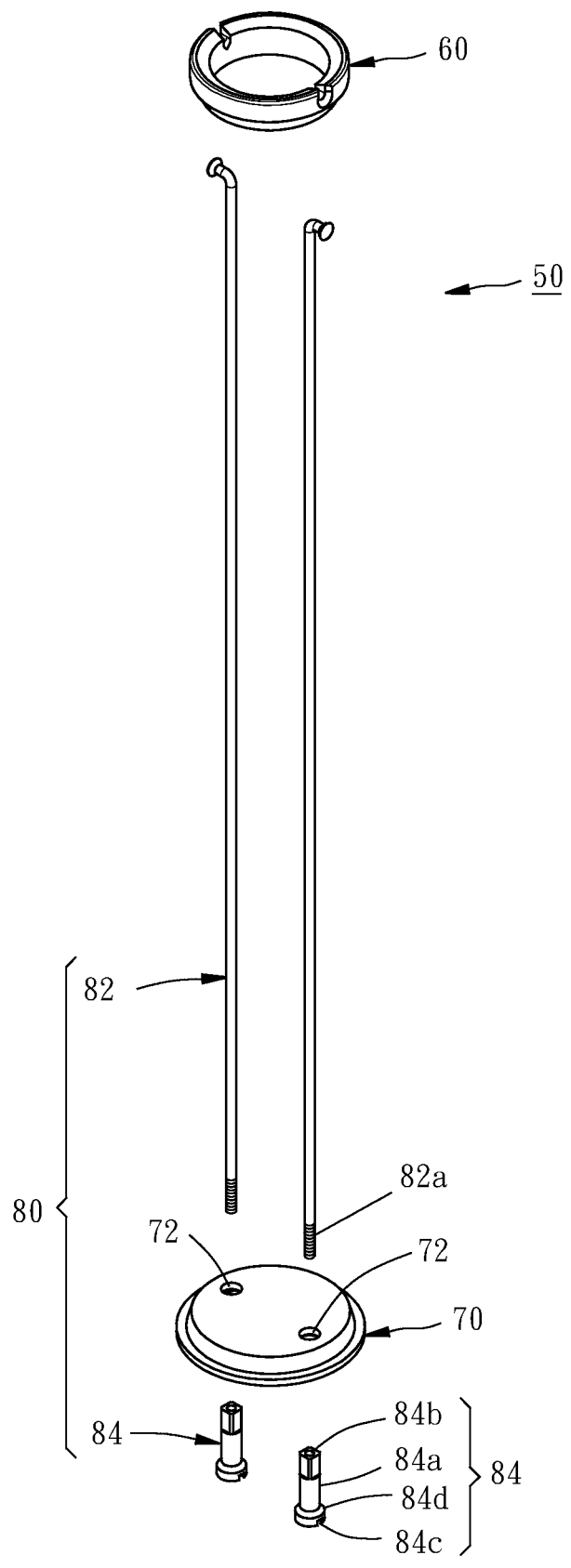
FIG. 4 is an exploded view of a second embodiment of the present invention.
Figure 5:
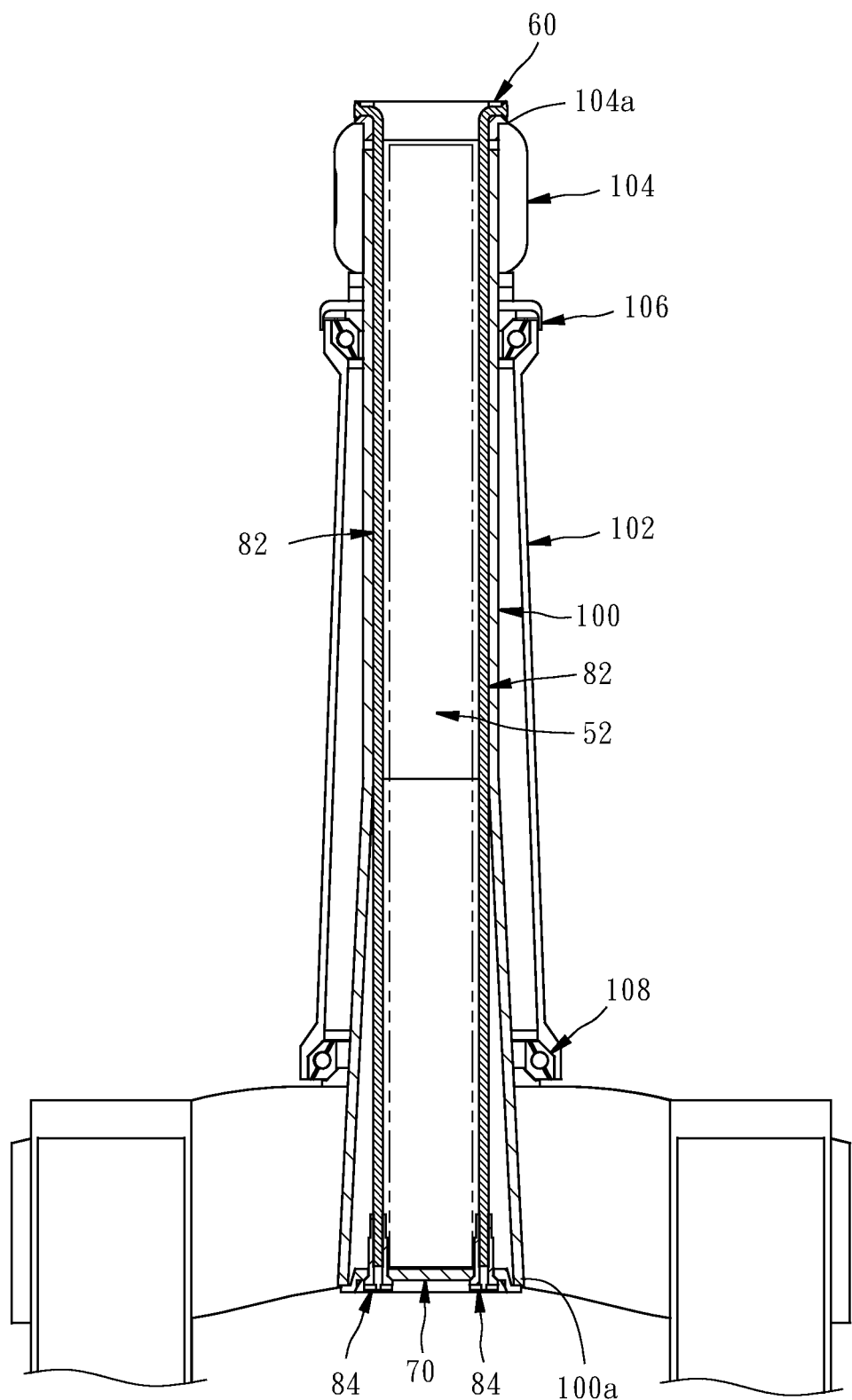
FIG. 5 is a sectional view of the second embodiment of the present invention mated with a steering tube, a head tube, a handlebar stem tube, an upper headset and a lower headset.

Referring secondly to FIGS. 4 and 5, a tightening and adjusting assembly 50 for a steering system of a bicycle according to a second embodiment of the present invention is shown. The tightening and adjusting assembly 50 also has a preload ring 60, an anchoring plate 70 and a tightening and adjusting set 80 including two straight bars 82 and two adjusters 84. The preload ring 60 has the same structure as the preload ring 20. The difference between the straight bars 82 and the straight bars 44 of the tightening and adjusting assembly 10 is that the second end 82a of each of the straight bars 82 has external threads. The anchoring plate 70 has two through holes 72 with a predetermined interval therebetween and abuts against the bottom end 100a of the steering tube 100. Each of the adjusters 84 has a shank portion 84a with a longitudinal hole 84b with internal threads, an enlarged flat head portion 84c, and a step surface 84d between the shank portion 84a and the enlarged flat head portion 84c. Each of the adjusters 84 passes through each of the through holes 72 of the anchoring plate 70 from the outside thereof such that the shank portion 84a of each of the adjusters 84 is located at the interior of the steering tube 100 and the step surface 84c of the adjuster 84 bears against the bottom surface 74 of the anchoring plate 70. The second end 82a of each of the straight bars 82 is threadably mated with the internal threads of the longitudinal hole 84b of the shank portion 84a of each of the adjusters 84. Thus, when each of the adjusters 84 is tightened, a pull-down force will be applied to the preload ring 60 via each of the straight bars 82 to preload the upper headset 106 and the lower headset 108. And, as the tightening and adjusting assembly 10, the tightening and adjusting assembly 50 can provide a receiving space 52 in the interior of the steering tube 100 for receiving bicycle accessories (such as battery pack, tool set, lamp, lock, etc.).

What is claimed is:

1. A tightening and adjusting assembly for a steering system of a bicycle, said steering system including a steering tube, a head tube, a handlebar stem tube, an upper headset and a lower headset, said steering tube being rotatably mounted within said head tube by means of said upper headset and said lower headset, said handlebar stem tube being mounted around said steering tube; said tightening and adjusting assembly comprising:
   a preload member engaged with a top end of said handlebar stem tube;
   an anchoring member abutted against a bottom end of the steering tube; and
   a tightening and adjusting set disposed in the interior of the steering tube and between said preload member and said anchoring member to draw said preload and anchoring members together and thus preload said upper and lower headsets,
   wherein said tightening and adjusting set comprises a suspending device, two straight bars and a tightening bolt; said suspending device having a threaded hole and disposed at the interior of the steering tube; each of said straight bars axially passing through said steering tube and having a first end connected with the preload member and a second end connected with said suspending device; said tightening bolt running through said anchoring member from the outside thereof and threadedly engaging with said threaded hole of said suspending device; whereby when said tightening bolt is tightened, a pull-down force will be applied to said preload member via said two straight bars to preload said upper headset and said lower headset.

2. The tightening and adjusting assembly as claimed in claim 1, wherein said preload member comprises a preload ring having a large portion abutted against said top end of said handlebar stem tube and connected with said second end of each said straight bar, and a small portion extending from said large portion and inserted into said handlebar stem tube.

3. The tightening and adjusting assembly as claimed in claim 2, wherein said preload ring further includes two notches oppositely disposed on said large portion thereof;

said first end of each said straight bar includes a hook with an enlarged head, each said hook being hooked in each said notch of said preload ring and said enlarged head being abutted against said large portion of said preload ring.

4. The tightening and adjusting assembly as claimed in claim 1, wherein said anchoring member comprises an anchoring plate having a central opening run through by said tightening bolt and an edge abutted against said bottom end of said steering tube.

5. The tightening and adjusting assembly as claimed in claim 1, wherein said suspending device has a block part and a shank part; said block part having a top surface, a bottom surface; said threaded hole running through said block part from said top surface thereof and extending axially along said shank part.

6. The tightening and adjusting assembly as claimed in claim 5, wherein said block part of said suspending device has a first side with a first positioning hole, and a second side with a second positioning hole, said second ends of the straight bars being respectively secured on said first and second positioning holes of the block part in such a way that said straight bars extend along and close to the inner wall of the steering tube.

7. The tightening and adjusting assembly as claimed in claim 2, further comprising a top cap detachably covered on said large portion of said preload ring.

8. A tightening and adjusting assembly for a steering system of a bicycle, said steering system including a steering tube, a head tube, a handlebar stem tube, an upper headset and a lower headset, said steering tube being rotatably mounted within said head tube by means of said upper headset and said lower headset, said handlebar stem tube being mounted around said steering tube; said tightening and adjusting assembly comprising:

a preload member engaged with a top end of said handlebar stem tube;

an anchoring member abutted against a bottom end of the steering tube; and a tightening and adjusting set disposed in the interior of the steering tube and between said preload member and said anchoring member to draw said preload and anchoring members together and thus preload said upper and lower, wherein said tightening and adjusting set comprises two straight bars and two adjusters, each of said straight bars having a first end connected with said preload member and a second end with external threads; each of said adjusters having a shank portion, an enlarged flat head portion, a step surface between said shank portion and said enlarged flat head portion, and a longitudinal hole with internal threads disposed on said shank portion; each of said adjusters passing through said anchoring member from the outside thereof such that said shank portion thereof is located at the interior of said steering tube, said step surface thereof bears against said anchoring member, and said longitudinal hole thereof is threadably mated with said second end of each of said straight bars.

9. The tightening and adjusting assembly as claimed in claim 8, wherein said anchoring member comprises an anchoring plate having two through holes with a predetermined interval therebetween and abutted against said bottom end of said steering tube; each of said adjusters passing through each of said through holes from the outside of said anchoring plate.

* * * * *